United States Patent
Li et al.

(10) Patent No.: US 10,771,620 B1
(45) Date of Patent: Sep. 8, 2020

(54) VIRTUALIZATION OF SMARTPHONE FUNCTIONS IN A VIRTUAL REALITY APPLICATION

(71) Applicant: Trend Micro Inc., Tokyo (JP)

(72) Inventors: Minmin Li, Nanjing (CN); Gang Chen, Nanjing (CN); Xiaoming Zhao, Nanjing (CN)

(73) Assignee: TREND MICRO INC., Tokyo (JP)

( * ) Notice: Subject to any disclaimer, the term of this patent is extended or adjusted under 35 U.S.C. 154(b) by 0 days.

(21) Appl. No.: 16/439,454

(22) Filed: Jun. 12, 2019

(51) Int. Cl.
*H04M 1/725* (2006.01)

(52) U.S. Cl.
CPC ... *H04M 1/72597* (2013.01); *H04M 1/72525* (2013.01); *H04M 1/72544* (2013.01)

(58) Field of Classification Search
CPC ......... H04M 1/72597; H04M 1/72525; H04M 1/72544
See application file for complete search history.

(56) References Cited

U.S. PATENT DOCUMENTS

| 2014/0280922 A1* | 9/2014 | Shapiro | H04N 7/17318 709/224 |
| 2019/0139321 A1* | 5/2019 | Kocharlakota | G06T 19/20 |
| 2019/0384482 A1* | 12/2019 | Shang | G06F 3/04815 |

\* cited by examiner

*Primary Examiner* — Wayne H Cai
(74) *Attorney, Agent, or Firm* — Beyer Law Group LLP (57) ABSTRACT

A mobile virtualization application allows a VR application user to access mobile telephone basic functions in a third-party VR application. This virtualization application may be a virtualization plugin or an independent application which virtualizes mobile functions and creates VR models. The virtualization plugin bridges between the VR application and the mobile telephone operating system allowing the user to use directly mobile telephone basic functions in the VR application. VR application users can read directly their incoming text messages, e-mail messages, application notifications, etc., in the form of VR model, and, they can use a VR application input device to control their mobile telephone basic functions in order to send messages, control a camera, etc.

20 Claims, 9 Drawing Sheets

FIG. 1
(PRIOR ART)

FIG. 2
Virtualization Application

FIG. 5
Screenshot of Telephone

FIG. 6

FIG. 7A
VR Environment on Mobile Telephone Screen

Two ways to trigger SMS reply:
1. Navigate to reply button, and press controller button
2. Long press controller button to enable microphone input and speak "Reply"

FIG. 7B
VR Environment on Mobile Telephone Screen

Long press controller button and speak what you want to send

Voice will be converted to text

FIG. 7C
VR Environment on Mobile Telephone Screen

Press "send" button or take advantage of voice input to send the SMS

FIG. 8
Virtualization Application

VIRTUALIZATION OF SMARTPHONE FUNCTIONS IN A VIRTUAL REALITY APPLICATION

FIELD OF THE INVENTION

The present invention relates generally to a user interface for a mobile telephone. More specifically, the present invention relates to accessing a mobile telephone from within a virtual reality application.

BACKGROUND OF THE INVENTION

Mobile virtual reality (VR) has become a big business in recent years. Many large companies have launched their own mobile VR headsets (sometimes called a VR viewer if it is handheld), such as the Google Daydream headset, Google Cardboard viewer, Samsung Gear VR headset, and so on. Basically, the user's mobile telephone, executing a VR application, is inserted into the headset so that the user is watching the VR application on the screen of their mobile telephone. There may also be a remote control with a touchpad, buttons, etc., in order to allow the user to navigate within the VR application, make selections, change volume, initiate an action, etc. Users thus use these VR headsets together with their mobile telephone to experience the VR application.

While playing the mobile VR application, however, the user can no longer access basic functions of the mobile telephone directly. For example, assume a user is playing a VR game while wearing the headset (and their telephone is mounted in the headset), and then an electronic mail message or SMS text message arrives, the only way to access this message is to take off the VR headset which means that the VR application will be interrupted. And, a user who is watching a VR application using a headset has no way to access basic mobile telephone functions such as sending a text message, taking a photograph, etc. Virtual reality headset vendors and third-party VR application providers both do not offer any solution to solve this problem.

Accordingly, a technique to allow a user access to basic telephone functions from within a VR application is desired.

SUMMARY OF THE INVENTION

To achieve the foregoing, and in accordance with the purpose of the present invention, a virtualization application is disclosed that helps VR users access basic functions of their mobile telephone, such as text messages, the camera, answering a telephone call, viewing application notifications, etc., all while continuing to view or play a VR application while wearing a VR headset in which their telephone is mounted.

A mobile virtualization technique is described which allows a VR application user to access mobile telephone basic functions in any third-party VR application. This mobile virtualization technique may be a virtualization plugin or an independent mobile application which virtualizes mobile functions and creates VR models in any third-party VR application. More specifically, this virtualization plugin is able to build a bridge between the VR application and the mobile telephone operating system allowing the user to use directly mobile telephone basic functions in the VR application. For example, VR application users can read directly their incoming text messages, e-mail messages, application notifications, etc., in the form of VR model, and, they can even use a VR application input device to control their mobile telephone basic functions.

The invention may be a standalone virtualization application on a mobile telephone, or may be integrated into any VR application product as a virtualization plugin. Or, the invention may be integrated into any security product on a mobile telephone as an add-on feature.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
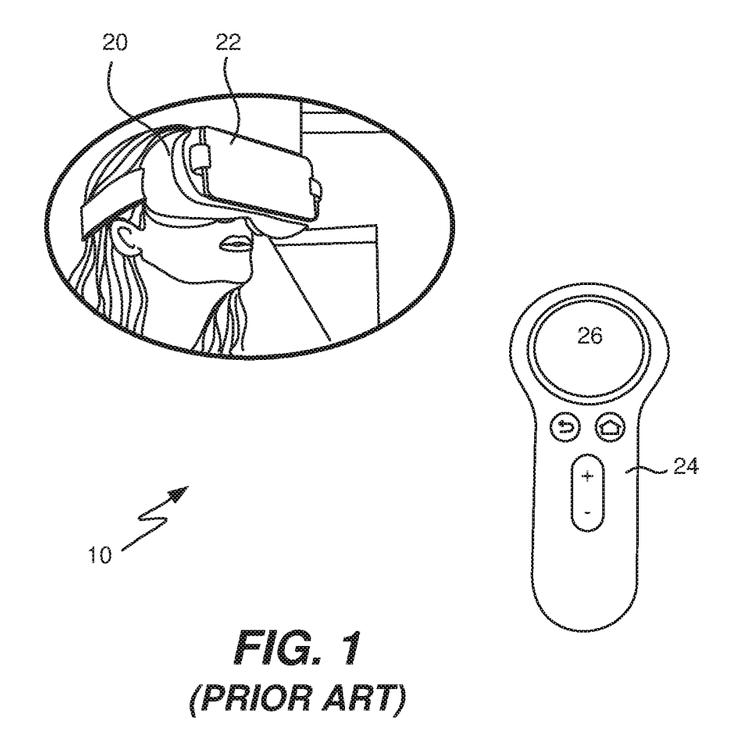
FIG. 1 illustrates an existing mobile virtual reality system.

FIG. 1 illustrates an existing mobile virtual reality system. Shown is a user wearing a headset to which is attached a mobile telephone 22. The user may be looking directly at the screen of the telephone or different type of lenses may be interposed between the user's face and the screen of the telephone. With this headset, the telephone is attached to the outer portion such that the back of the telephone is still visible, whereas with other headsets the telephone is inserted inside the headset such that the telephone cannot be seen from the outside. In either configuration the user cannot touch the screen nor have access to any buttons on the surface of the telephone; attempting to touch buttons on the side of the telephone is either not possible or difficult. In operation, a virtual reality application executes upon telephone 22 and the user views the virtual-reality environment displayed on the screen of the telephone.

Many mobile virtual-reality systems will also include a remote control 24. A typical remote control will include a touchpad 26 used to navigate or make selections within the VR application (by pressing or swiping), as well as a "back" button, a "home" button, volume buttons, and a trigger (not shown) on the underside of the remote control. The user manipulates this remote control in order to navigate and make selections while the VR application is executing and the viewer is watching the screen.

As will be appreciated, because the VR application is executing, and because the user cannot touch the screen of the telephone nor any buttons upon the front side while wearing the headset, the user is unable to access any of the mobile telephone native functions such as text messaging, camera, telephone call, other applications, etc.

Mobile Virtualization Application Diagram

Figure 2:
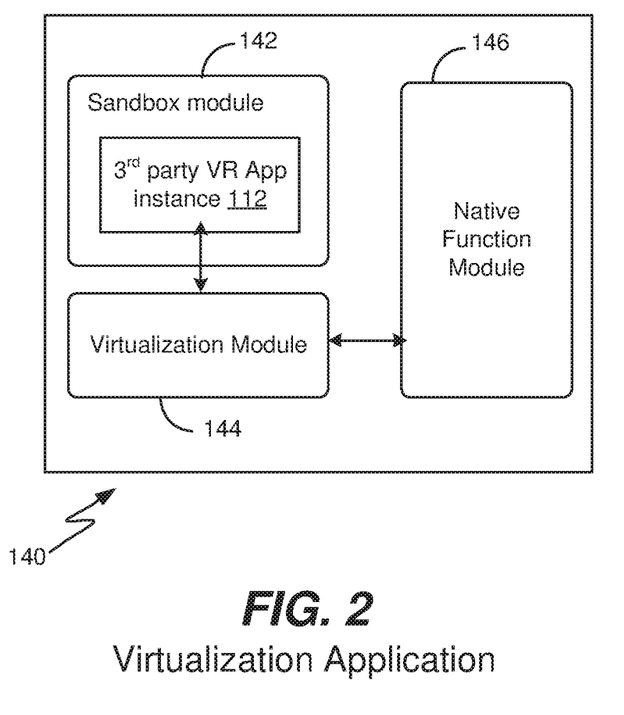
FIG. 2 is a block diagram of a mobile virtualization system.

FIG. 2 is a block diagram of a mobile virtualization application 100. Mobile telephone 22 (not shown) includes a memory in which this application may execute. As known in the art, any third-party VR application may be downloaded and present in storage of the telephone, and when executed, will create an instance 112 that exists in the memory. In addition, the VR application includes a VR engine 114 (not shown) that also exists in memory.

As mentioned, the invention may be embodied in a standalone virtualization application 140 on a mobile telephone or may be integrated into a VR application as a virtualization plugin. The below description refers to the standalone virtualization application, although one of skill in the art will be able to produce the virtualization plugin upon a reading of this disclosure.

The mobile virtualization application 140 contains three modules: sandbox module 142, virtualization module 144 and native function module 146, as shown. For simplicity, these modules are shown as software modules that may be stored in persistent storage on the mobile telephone; in operation their code also executes in memory, and that operation is described below. In particular, VR instance 112, the VR engine 114 and modules 142-146 will execute in the memory space reserved for the virtualization application.

Sandbox module 142 is a virtual framework on a mobile platform that allows running a third-party VR application instance within the module. Sandbox module 142 provides the ability for the virtualization module 144 to have the authority to inject any program into the memory space of a VR application executing on telephone 22. Virtualization module 144 creates and maintains VR models, which interact with a VR user as a virtual user interface of mobile native functions while the user is executing and using the VR application with a headset. These models may display an output received on the telephone (such as a text message received), and may also display an interface for an input to the telephone (such as a prompt to push a button on the remote control or to give a voice input). Once sandbox module 142 launches a VR application, virtualization module 144 automatically injects a program into VR engine 114 in order to modify the current VR instance, including VR two-dimensional and three-dimensional model creation, VR event capture, etc.

Native function module 146 manages all supported mobile native functions, such as text messaging, e-mail messaging, camera, GPS, audio, installed applications, and so on. This module delivers messages and data to and from virtualization module 144 to help virtualize these native functions in a VR model; it also provides a control interface for the virtualization module to operate these native functions by sending control signals to module 146.

Figure 3:
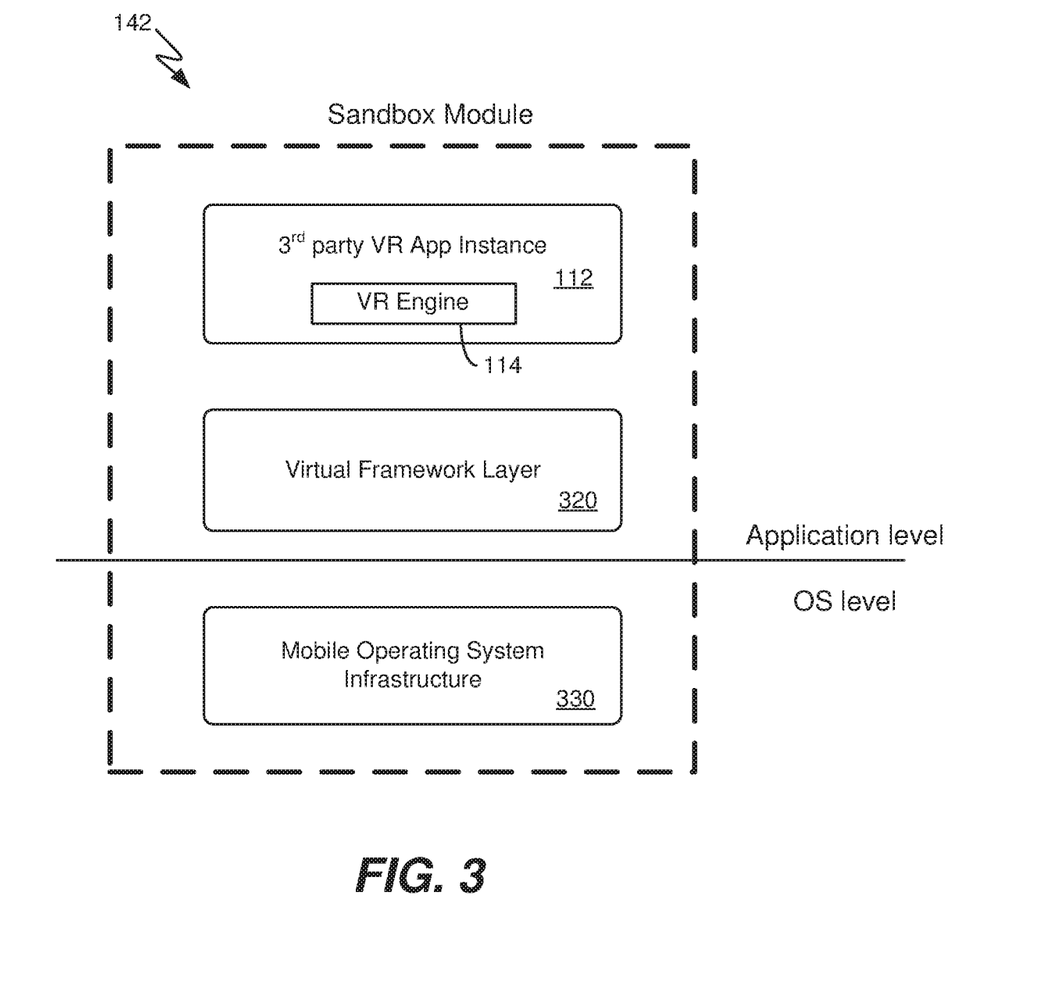
FIG. 3 is a block diagram of a sandbox module and a portion of a mobile telephone operating system according to an embodiment of the invention.

FIG. 3 is a block diagram of a sandbox module 142 operating within a mobile telephone operating system according to an embodiment of the invention. Shown is an executing sandbox module that has loaded and launched a VR application, and includes VR App instance 112 and VR engine 114 in its memory. The inventors have realized that using a sandbox module is an advantage for this invention. As known in the art, all mobile operating systems (e.g., iOS, Android, etc.) provide to a smartphone application its own protected memory space for execution, in order to provide isolation from other processes. In general, without having a root privilege, one application (or its executing process) cannot affect another application (or its process), i.e., cannot change the memory space of another process. Also shown is mobile operating system infrastructure 330 (which may include a native layer and the Linux kernel) which is a known part of the operating system and which is used by the executing sandbox module.

As mentioned above, we need to have the ability to modify the virtual-reality environment displayed to the user on the screen of the telephone while playing a VR application. A sandbox module is a good solution to provide this access to the VR environment. As known, a sandbox module is an application that runs directly on a mobile telephone operating system and can execute other processes within it. The process being run within the sandbox module believes it is executing directly by the operating system. Accordingly, sandbox module 142 has an application-level virtualization infrastructure 320 to load a third-party VR application package file (e.g., an Android APK file) and then launch the VR application. In this case, the VR application does not know that it is actually running in a sandbox module, and from the perspective of the mobile telephone operating system, there is only one application and process: the sandbox module and the VR application instance are the same process. Application-level virtualization infrastructure 320 consists of many virtualized operating system components, which are required to install and launch an application instance, such as virtualized system service, a virtualized file system, virtualized memory management, and so on. Infrastructure 320 is a simple encapsulation of a real system service, file system and memory management implemented at the application level.

The sandbox module may be written in any suitable computer code. In one particular embodiment, we use an open source Android sandbox development toolkit called "VirtualApp" available from "github.com." Details are available from "https://github.com/asLody/VirtualApp." VirtualApp creates a virtual space within which any application may be installed. One may install, start and uninstall an application (e.g., an APK file of a VR application) arbitrarily in the virtual space, which is isolated from the outside, just as in a sandbox module. Because the user only sees the user interface of the virtualization application, he or she will be unaware of the existence of this development toolkit.

Flow Diagrams

Figure 4:
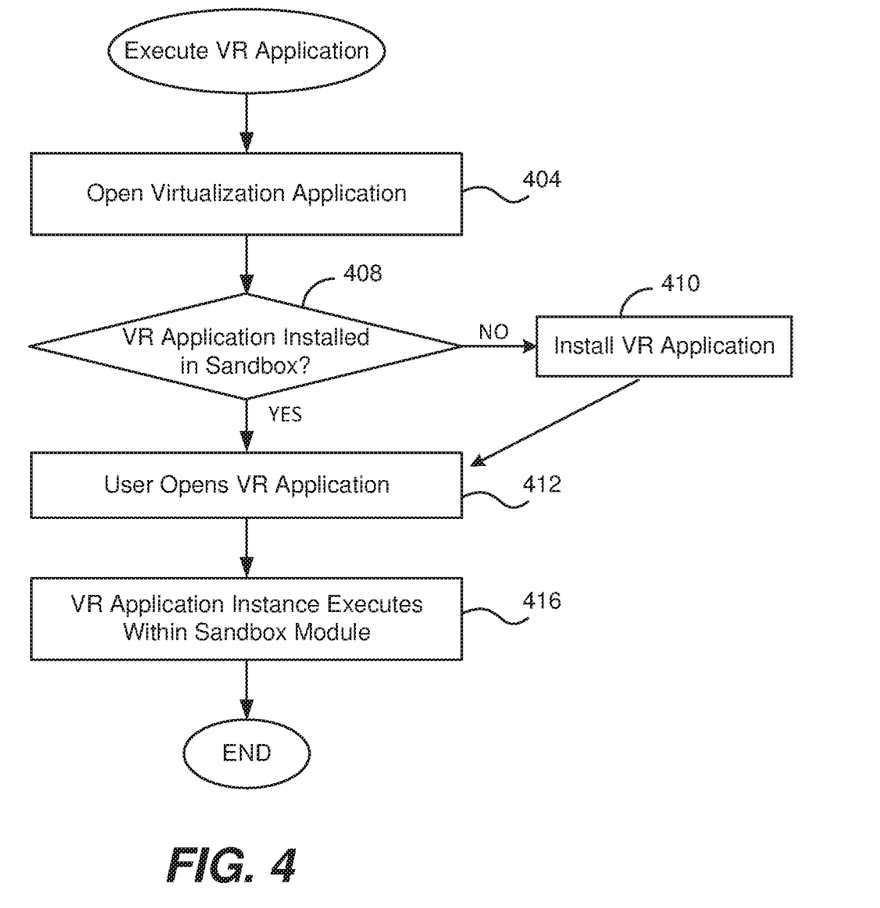
FIG. 4 is a flow diagram describing one embodiment by which a VR application is executed on a mobile telephone.

FIG. 4 is a flow diagram describing one embodiment by which a VR application is executed on a mobile telephone. As mentioned above, a virtualization application 140 is used and includes a sandbox module, a virtualization module, and a native function module. In a first step 404 the user opens the virtualization application on his or her mobile telephone, and in this step, the sandbox module within the virtualization application is automatically executed. The software begins executing, for example as shown in FIG. 5.

In step 408, if the VR application that the user wants to play has not yet been installed, the user needs to install VR application first in step 410. Once VR application has been installed, the user can find the icon 508 for the VR application on the launch page 502, and click it to open VR application in step 412, which will automatically be opened within the sandbox module. From that point on, in step 416 the VR application instance 112 will be executing within the sandbox module 142.

Figure 5:
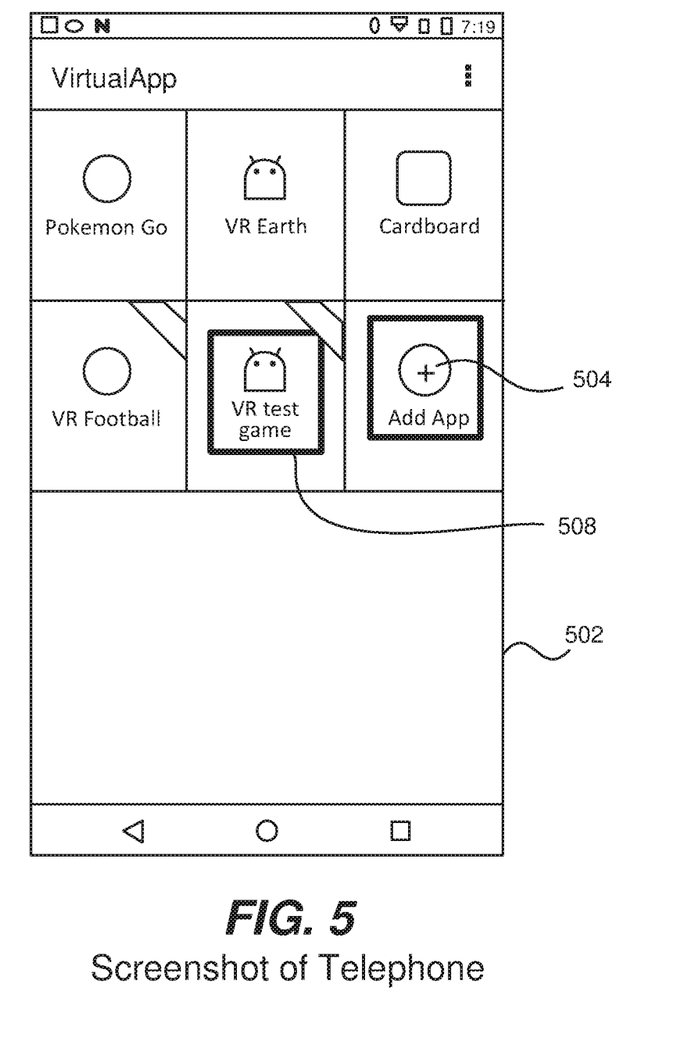
FIG. 5 illustrates a screenshot of a mobile telephone.

FIG. 5 illustrates a screenshot of a mobile telephone. As shown at 504, a user may load an APK file of a VR application (for example) in order to install the VR application in the sandbox module. As shown at 508, the user clicks upon the icon in order to launch the VR application within the sandbox module. At this point, the VR application instance 112 together with its VR engine 114 (the VR engine is a component of the VR application) are executing within the sandbox module and are both unaware that they are executing within the sandbox. And, as shown in FIG. 2, modules 144 and 146 are separate from the sandbox module 142. All modules 142, 142, 146 execute in the memory space of virtualization application 140. Once 508 is clicked, the user may mount the telephone in the VR headset.

Figure 6:
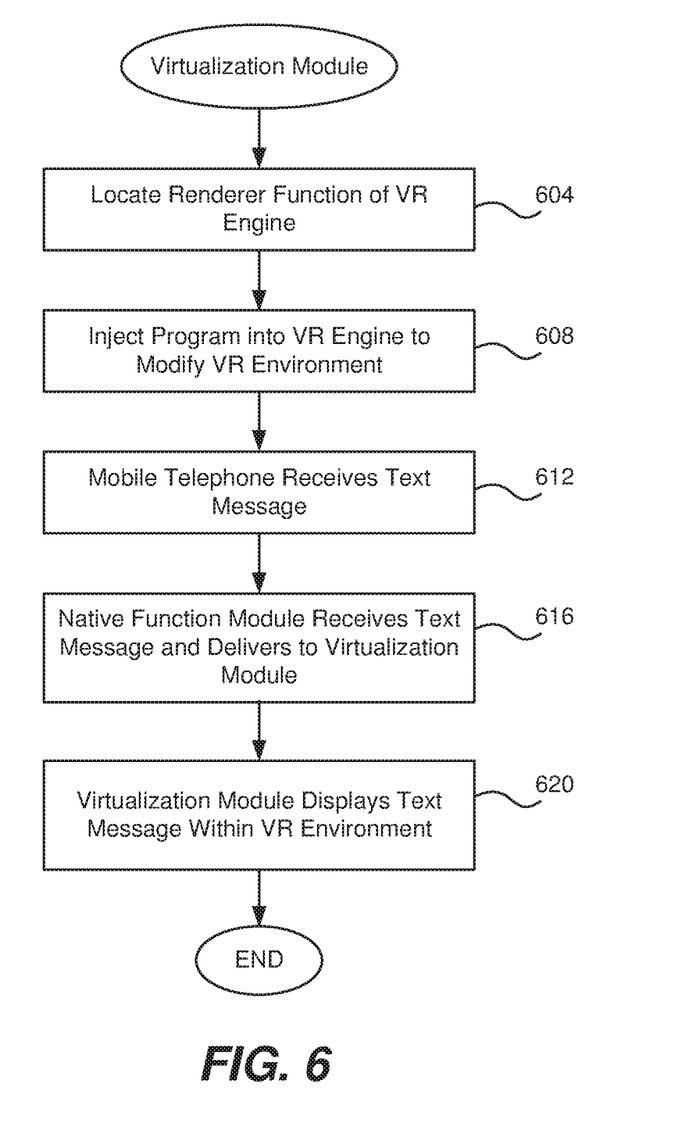
FIG. 6 is a flow diagram describing one embodiment by which the virtualization module executes on a mobile telephone.

FIG. 6 is a flow diagram describing one embodiment by which the virtualization module executes on a mobile telephone. As known, all VR applications are powered by 3-D rendering engines, and, no matter which 3-D engine, there is always a real-time renderer function that renders 2-D or 3-D models multiple times per second. We locate this real-time renderer function (in order to change its program logic) and we then we add our own 3-D models into the VR environment to provide access to the mobile telephone functions.

In a first step 604, we locate the renderer function of the VR engine of the target VR application. Because this VR application is now executing within the sandbox module, its program memory space is now available and under control of the virtualization application. Accordingly, we are able to find the function address in the memory space using reverse engineering.

One particular embodiment for using reverse engineering to find this function address is directed at the Unreal VR engine (available from Epic Games). Different VR engines require different reverse engineering approaches due to the different implementations of each engine renderer. Taking the Unreal engine as an example, the renderer program is packaged in a dynamic link library, which is implemented in C++ before compilation. First, because the Unreal engine is open source, we build a pattern of the binary code of the renderer function (this is a pre-process that can be done manually). Next, after the VR application is launched, the dynamic link library is loaded into application memory space, and we are able to find the initial address of the library. Finally, we search the memory space of the dynamic link library to locate the address of the program matching the pattern we built earlier.

In a next step 608, we inject a custom program into the renderer function in order to modify the VR environment (as described in steps 612-620 and shown in FIG. 7). This may be accomplished by adding a software hook to this function thus injecting our own custom program in order to add a 3-D model or models to the renderer function using a VR script file 820. This software hook and program may be added at the beginning or the end of the renderer function. Since the VR engine has a main daemon thread that calls the renderer function in order to update the screen frame multiple times per second, the hook program will also be triggered together with the renderer function when called. The hook program (via the script file) not only can display a text message in the VR environment, but also can receive input via VR input system 890 in order to control a native function of the telephone. Both functionalities may be in one program, or, there may be two programs.

Although the present invention may be used with any available VR application or VR engine, in one particular embodiment, the invention injects a custom program into the Unity 3-D VR engine. The custom program is now able to display a 3-D model that allows access to the mobile telephone functions, such as displaying input to the telephone within the VR environment or by providing an interface for controlling a basic function of the telephone using the VR environment (such as sending a text or e-mail message, taking a photograph, playing audio, etc.).

In step 612 the mobile telephone receives a text message. The telephone may also receive other input such as an e-mail message, notification, alert, etc., and the present invention is able to display that information as described below. The text message is received as normal, but because the VR application is executing and because the user does not have access to the screen nor the telephone buttons, he is normally not able to view this text message. By using the present invention, however, this text message may be displayed within the VR environment.

In step 616 the native function module 146 (which is executing within the virtualization application) accesses this text message and delivers it to the virtualization module 144. The native function module finds the text message, retrieves it, and delivers it in different manners, depending upon the mobile operating system. The Android and iOS operating systems both provide an API for an application to monitor incoming SMS messages and the sending of SMS messages. Take Android for example. First, in order to access the mobile SMS messages, an application needs a permission granted by the user. This permission can be given during application installation or application execution, depending upon the Android version. Next, native function module 146 registers a broadcast receiver to listen for an operating system SMS event. Once the system receives an SMS message and broadcasts it, our registered receiver receives all of the information about the SMS message, including the text message, telephone number, contact name, and arrival timestamp. Finally, native function module 146 packages and sends this data to the virtualization module 144 via a function call.

In step 620 the virtualization module (executing within the virtualization application) receives this text message from the native function module and displays it within the VR environment as described below.

Example of VR Model Added to a VR Environment

Figure 7A:
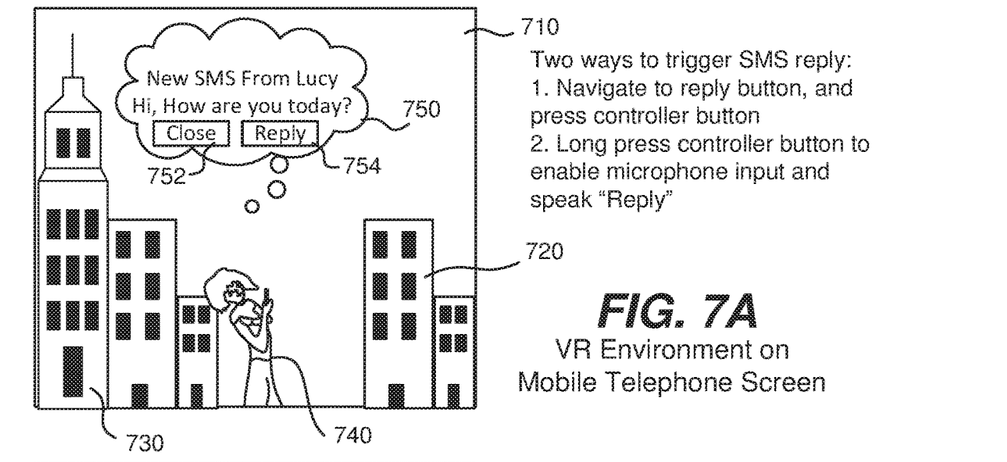
FIG. 7A-C illustrates a VR environment as seen on the screen of a mobile telephone after the text message has been displayed to the user.

FIG. 7A illustrates a VR environment 710 as seen on the screen of a mobile telephone after the text message has been displayed to the user in step 620. Shown is a VR environment 710 having a gray background and buildings 720 and 730 that are part of the VR application. Because of the incoming text message, to this environment has been added cartoon character 740 and text 750 (in a text balloon). The text includes the notification that this is an SMS text message from a user having a name of "Lucy" and the actual content of the text message itself "How are you today?" Thus, the incoming text message retrieved from the mobile telephone native function has been displayed within the VR environment using the VR model as shown.

As shown, the balloon 750 also includes a "close" button 752 and a "reply" button 754 indicating that the user may reply to this text message from within the VR environment. The user may not directly push these buttons, but, can access these buttons using the remote control 24 or voice input of the telephone. Using the remote control, the user may navigate to either of these buttons and press a button on the remote control (using a priori knowledge, e.g., using the "+" button) to select "close" or "reply." Selecting "close" causes the displayed VR model to disappear, i.e., leaving only buildings 720 and 730 and the background. Selecting "reply" brings up a new balloon. The button "reply" may also be selected by holding down the remote control button to enable the microphone input of the telephone and then speaking "reply." Selecting "reply" in this way also brings up a new balloon.

Using voice input may be accomplished in the following manner. It is the microphone on the telephone that picks up user's voice command There are three main steps to receive and process the voice command. When the user holds down the VR controller button for a predetermined amount of time, the VR script will receive a "hold down" event, and then it sends a command to native function module 146 through VR bridge 850 in order to enable the telephone microphone input. Once the native function module receives the command, it calls the telephone system service to enable the telephone microphone for input. The user continues to hold down the button while speaking the command.

Next, when the user releases the VR control button after finishing the voice input, the VR script receives a "release" event, and then it sends a command to the native function module to disable the telephone microphone input. The native function module then calls the system service to retrieve the voice data, and sends the data to VR bridge 850.

Finally, the VR bridge converts the voice data to text via any suitable speech-to-text software, and parses the text. The parsed result may be a pre-defined command (e.g., "reply") or text data (e.g., an SMS message to be sent), and is delivered back to the VR script. As mentioned before, the VR script controls the actions of VR model. In this case, according to the received command and data, the VR script changes the VR model to change the user interface in the VR environment according to the command and text received. For example, if the user is controlling with voice input, after speaking "reply" in response to seeing FIG. 7A, the VR script produces FIG. 7B. Once the message has been spoken, the VR Script produces FIG. 7C; once the user speaks "send" then the VR script closes the balloon 770 and removes cartoon character 740.

Figure 7B:
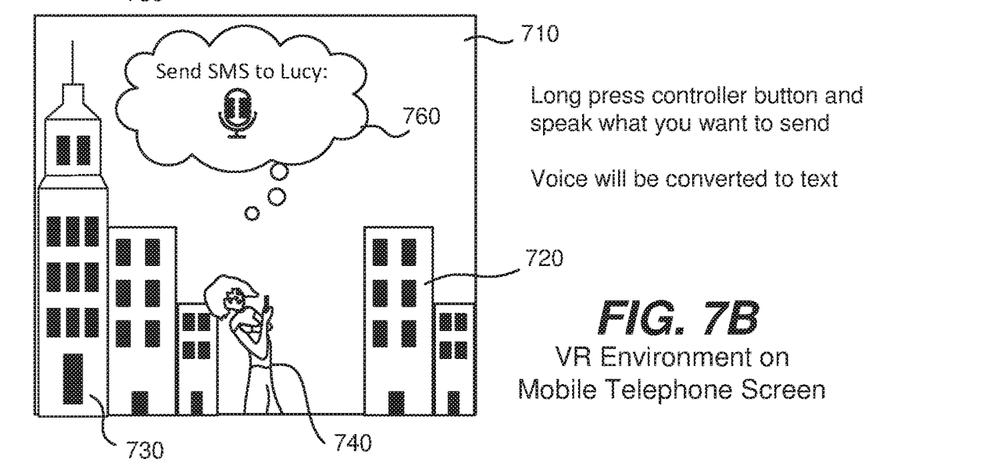

FIG. 7B illustrates a VR environment 710 as seen on the screen of a mobile telephone after the user has selected "reply" via voice command. Shown is a VR environment 710 having a gray background and buildings 720 and 730 that are part of the VR application. Because of the selection of "reply" via voice, to this environment has been added cartoon character 740 and text 760 (in a text balloon) with a microphone symbol. The user may now reply to the text message by holding down the remote control button and speaking what it is he or she wishes to send. The speech will be converted to text and sent via an SMS message as described above and with reference below to FIG. 8.

Figure 7C:
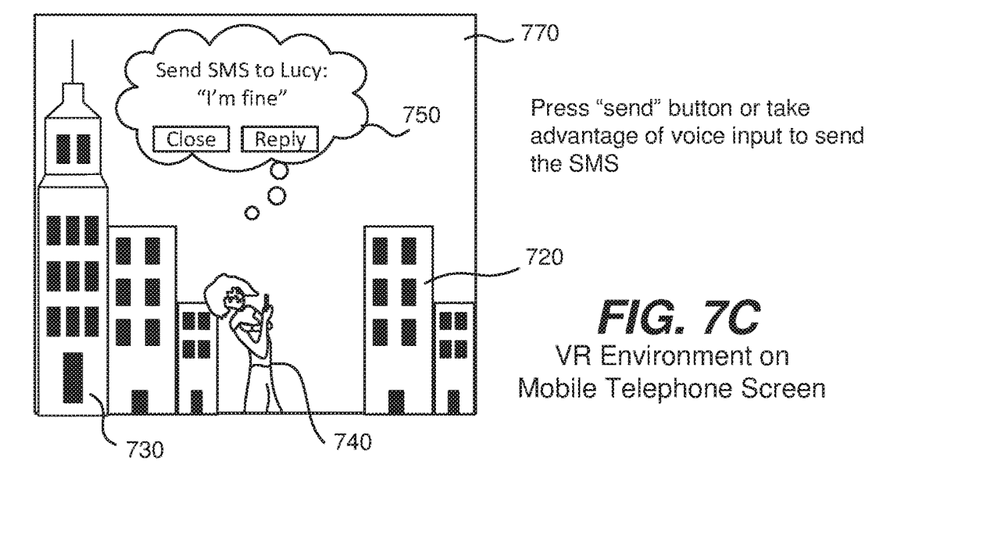

FIG. 7C illustrates a VR environment 710 as seen on the screen of a mobile telephone after the user has selected "reply" via pressing the "reply" button. Shown is a VR environment 710 having a gray background and buildings 720 and 730 that are part of the VR application. Because of the selection of "reply" via button, to this environment has been added cartoon character 740 and text 770 (in a text balloon) which includes the option to send the message, the actual message, and "cancel" and "send" buttons. The user may now send the text message by navigating to "send" and pressing the remote control button, or by holding down the remote control button and speaking "send." The message will be sent via an SMS message as described below in FIG. 8. Any number of a priori text messages such as "I'm fine" may be stored in the VR script file 820.

Sending or Receiving a Text Message from within VR Environment

Figure 8:
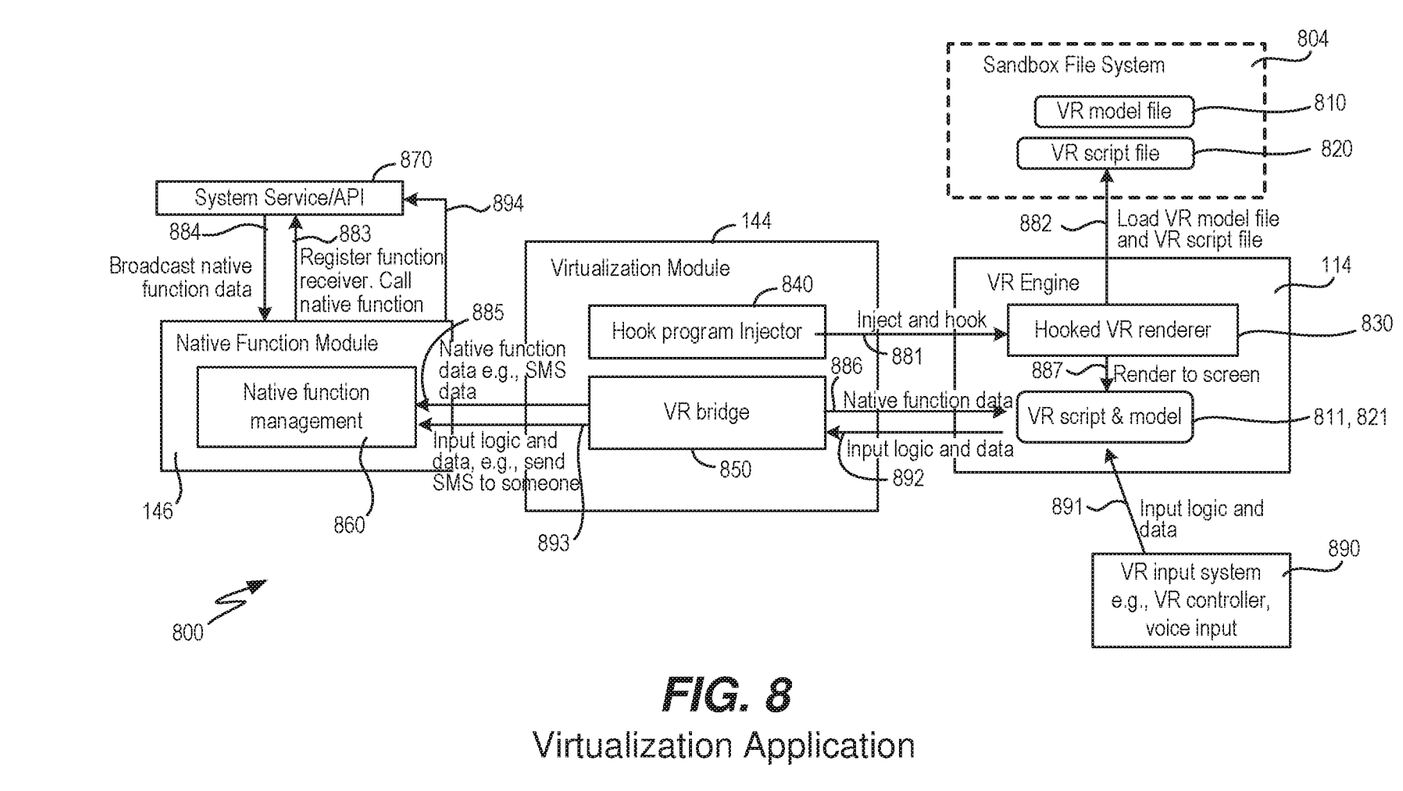
FIG. 8 is a detailed block diagram of virtualization application in operation.

FIG. 8 is a detailed block diagram 800 of virtualization application 140 in operation. Shown is how an incoming SMS message is displayed in a VR environment. There are two sub-modules in virtualization module 144: hook program injector 840 and VR bridge 850. As mentioned before, the injector 840 injects 881 the hook program into the VR renderer function 830, and then the hooked program is able to load 882 the VR model file 810 and VR script file 820 of the cartoon character 740 (including popup dialog 750) from sandbox file system 804 into the VR engine 114 where they become VR script 811 and VR model 821. The VR model file 810 and VR script file 820 are virtualization application built-in files, which are generated by VR engine editing tools manually and are packaged into the virtualization application during application building. The VR model file 810 contains all the information about how the 3-D character 740 looks; the VR script file 820 contains script to control the model actions, display text balloons, input events from the user, such as the display of models in FIGS. 7A-7C, processing the input from the remote control or by voice, and so on.

After these resource files 810, 820 are loaded, VR engine 114 maintains the VR script and VR model in its memory space. Moreover, VR bridge 850 communicates with VR script 821 to control which text message to display, what animation 3-D character should perform, and when to display or hide the 3-D character, and so on. This communication may be implemented by a process communication method, such as pipe communication.

As explained above, mobile operating system services are accessed via an API 870 from module 146. In 883, native function module 146 registers a broadcast receiver to listen for an operating system SMS event. In 884, once the operating system receives an SMS message and broadcasts it, the registered receiver receives all of the information about the SMS message, including the text message, telephone number, contact name, and arrival timestamp. In 885, native function module 146 packages and sends this SMS data to the VR bridge 850 of virtualization module 144 via a function call. Next, in 886 this SMS data is sent to VR engine 114 where it may be incorporated into the VR model 821 and thus rendered 887 to the screen of the user's mobile telephone within the VR application, such as shown in FIG. 7.

In a similar fashion, the invention may control a mobile native function (an output), such as sending a text message, taking a photograph, etc. The user supplies an input to the telephone to initiate the sending of the message or taking of the photograph, etc. As shown in FIG. 8, VR input system 890 includes VR controller 24, a voice input of the telephone 22, a telephone camera input, etc. VR controller 24 may send simple logic input, such as "yes" or "no" by pressing buttons on controller 24. Voice input can send both logic input and data via speech-to-text technology. For example, the user presses one button (or more buttons) to initiate a text message, speaks a phrase, and all data is transferred to telephone 22 including the voice phrase and an instruction to send a text message.

In 891 the input system transfers the command ("send text message") and phrase to VR engine 114 which receives this input via the hook program that has been injected. In 892, this hook program sends the input logic and data to VR bridge 850. In 893, the logic and data is sent to module 146, which in 894 calls a native function ("send text message") to process sending of the text message. The phrase is transcribed into text via speech recognition on the telephone, or, this voice-processing task may be performed by the VR bridge module 850. To take a photograph, the button input received at 890 is similarly passed to API 870 which then calls the camera native function to take a photograph.

Computer System Embodiment

Figure 9A:
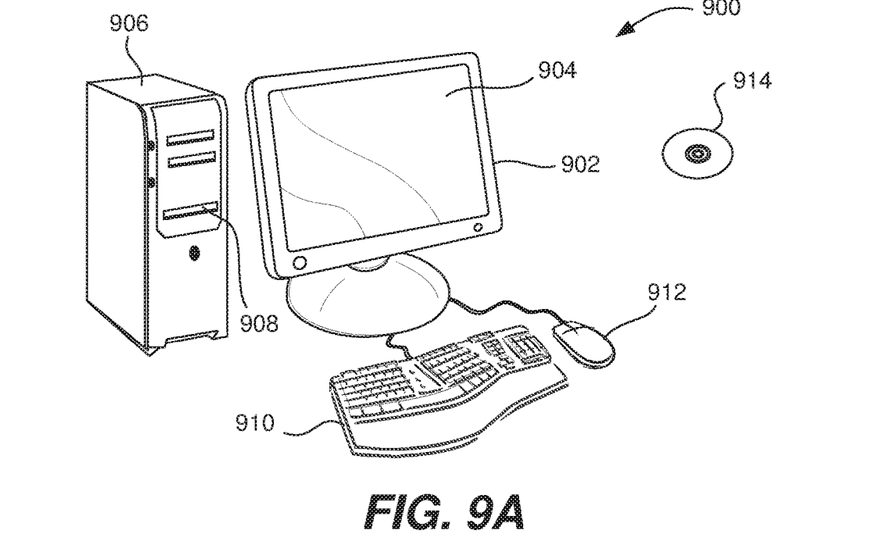
FIGS. 9A and 9B illustrate a computer system suitable for implementing embodiments of the present invention.
Figure 9B:
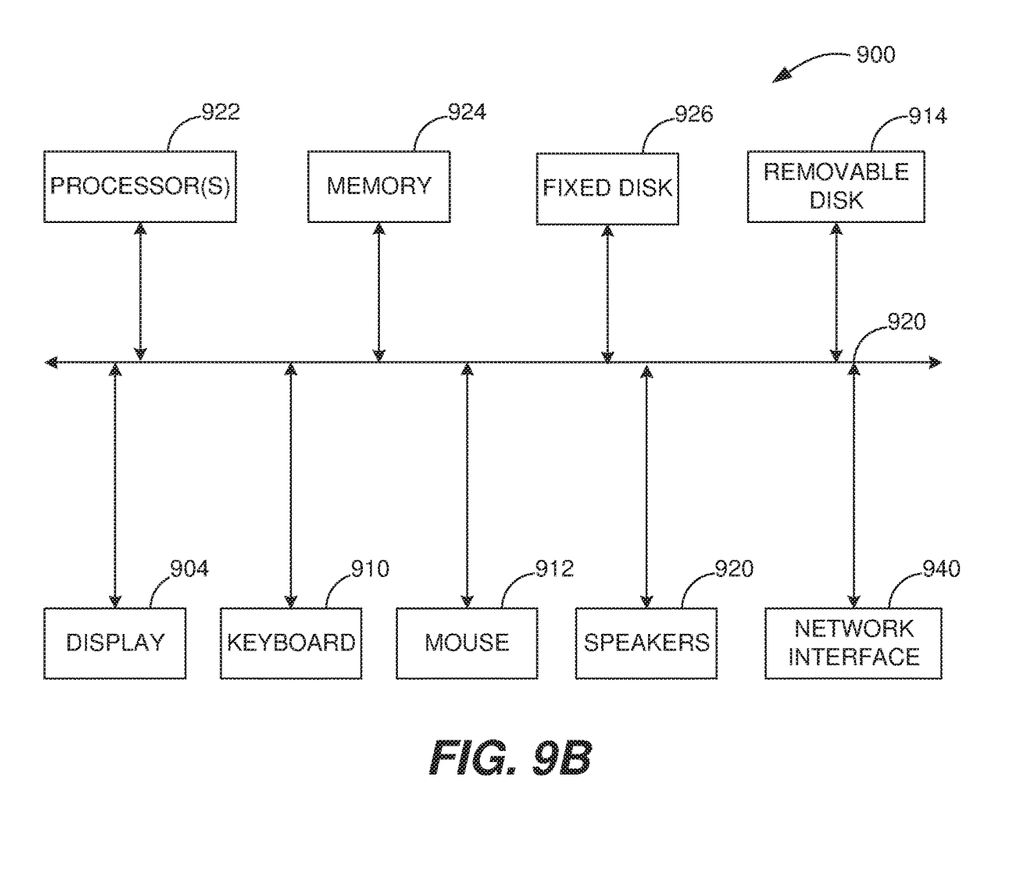

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of viewing a notification within a virtual reality (VR) application on a mobile telephone, said method comprising:
    installing a VR application within a sandbox module executing within a virtualization application on a mobile telephone;
    injecting a software program into memory space of a rendering function of said VR application by said virtualization application;
    receiving a notification on said mobile telephone;
    sending said notification from said mobile telephone to said virtualization application; and
    during execution of said rendering function, executing said software program in order to render said notification on a display of said mobile telephone within a VR environment of said VR application.

2. A method as recited in claim 1 wherein said notification is a text message, an alert from an application of said mobile telephone, a notification front an application of said mobile telephone, or an e-mail message.

3. A method as recited in claim 1 wherein said mobile telephone is held within a VR headset worn by a user.

4. A method as recited in claim 1 wherein said adding further comprises:
    injecting a software hook by said virtualization application into said rendering function in order to add said software program.

5. A method as recited in claim 4 wherein said adding further comprises:
    locating the function address of said renderer function in the memory space of said VR application.

6. A method as recited in claim 1 further comprising:
    executing an instance of said VR application in said sandbox module.

7. A method as recited in claim 1 further comprising:
    sending said notification from said mobile telephone by broadcasting notification data to a registered function receiver of said virtualization application.

8. A method as recited in claim 1 further comprising:
    executing, by said software program, a VR script to display a VR model that includes said notification.

9. A method as recited in claim 8 wherein said VR script and said VR model are loaded from files in a file system of said sandbox module.

10. A method as recited in claim 8 wherein said VR script and said VR model are loaded from files in a file system of said sandbox module.

11. A method of controlling a mobile telephone within a virtual reality (VR) application executing on a mobile telephone, said method comprising:
    installing a VR application within a sandbox module executing within a virtualization application on a mobile telephone;
    injecting a software program into memory space of a rendering function of said VR application by said virtualization application;
    receiving an input command from a user of said mobile telephone by said VR application;
    during execution of said rendering function, executing said software program in order to capture said input command;
    sending said input command from said software program to said virtualization application; and
    calling a native function of said mobile telephone by said virtualization application using said input command.

12. A method as recited in claim 11 wherein said input command is a spoken word, or results from an actuation of a remote control associated with said mobile telephone.

13. A method as recited in claim 11 wherein said mobile telephone is held within a VR headset worn by a user.

14. A method as recited in claim 11 wherein said adding further comprises:
    injecting a software hook by said virtualization application into said rendering function in order to add said software program.

15. A method as recited in claim 14 wherein said adding further comprises:
    locating the function address of said renderer function in the memory space of said VR application.

16. A method as recited in claim 11 further comprising:
    executing an instance of said VR application in said sandbox module.

17. A method as recited in claim 11 further comprising:
    calling said native function of said mobile telephone by accessing an API of said mobile telephone by said virtualization application.

18. A method as recited in claim 11 further comprising:
    executing, by said software program, a VR script to display a VR model that includes a user interface.

19. A system for controlling a mobile telephone from within a virtual reality (VR) application executing on said mobile telephone, said system comprising:
    a mobile telephone;
    a sandbox module executing on said mobile telephone and arranged to install and execute a VR application instance of said VR application;
    a software program arranged to render a VR model on a display of said mobile telephone within a VR environment of said VR application, said VR model providing a user interface;
    a virtualization module arranged to inject said software program into memory space of a renderer function of said VR application using a hooking mechanism; and
    a native function module arranged to forward a notification from said mobile telephone to said VR model and to forward an input command from said software program to said mobile telephone, whereby a user of said mobile telephone controls said mobile telephone using said VR model.

20. A system as recited in claim 19 further comprising:
    a remote control that sends said input command to said VR application instance when actuated by said user.

* * * * *